(12) United States Patent
Bartlett

(10) Patent No.: US 6,252,636 B1
(45) Date of Patent: Jun. 26, 2001

(54) PULSED TWO LAMP SINGLE LIGHT VALVE DISPLAY SYSTEM

(75) Inventor: Terry A. Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/038,346

(22) Filed: Mar. 11, 1998

Related U.S. Application Data

(60) Provisional application No. 60/040,533, filed on Mar. 12, 1997.

(51) Int. Cl.[7] ....................................... H04N 9/31
(52) U.S. Cl. ........................................... 348/743; 348/760
(58) Field of Search ................................. 348/742, 743, 348/744, 759, 760, 761, 762, 763, 764, 765; 353/84, 85; H04N 9/31

(56) References Cited

U.S. PATENT DOCUMENTS 5,428,408   6/1995   Stanton ................................. 348/742
5,680,180   * 10/1997   Huang ................................. 348/743

* cited by examiner

*Primary Examiner*—David E. Harvey
(74) *Attorney, Agent, or Firm*—Charles A. Brill; Wade James Brady, III; Frederick J. Telecky, Jr.

(57) ABSTRACT

A pulse driven two lamp (40, 50) single light valve (62) imaging display system (10). The first lamp (40) is used to generate red light, and the second lamp (50) is used to generate blue and green light. A beam splitter (46) combines the white light of the two light sources, and directs the light to a color wheel (26). The first red lamp (40) is driven at a peak power being 3X the average power rating of the lamp for ⅓ of a video frame. The second blue-green lamp (50) is pulse driven at a peak power being 150% its average power rating for ⅔ of a video frame. The present invention achieves improved color balance and increased intensity, and is a simple and cost effective architecture.

13 Claims, 4 Drawing Sheets

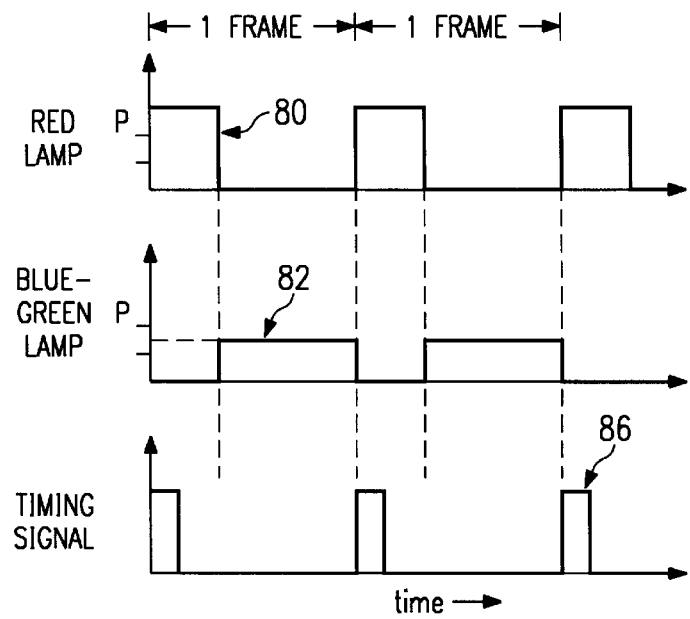
FIG. 2
FIG. 3
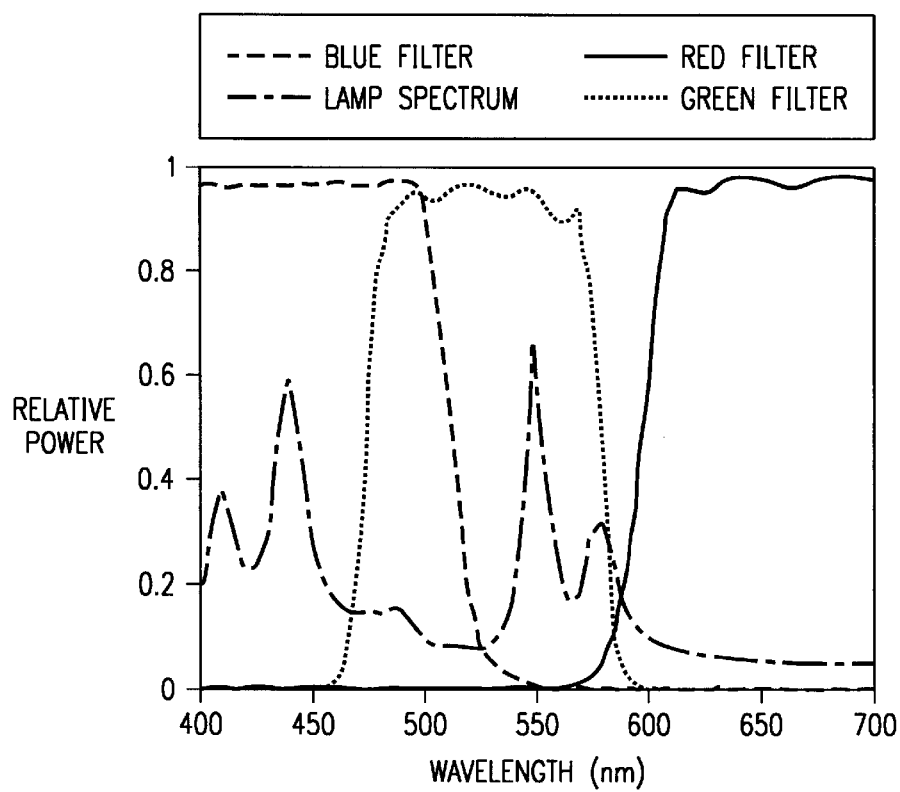

PULSED TWO LAMP SINGLE LIGHT VALVE DISPLAY SYSTEM

CROSS REFERENCE TO RELATED APPLICATIONS:

This application claims priority under 35 U.S.C. § 119 (e)(1) of provisional application Ser. No. 60/040,533 filed Mar. 12, 1997.

Cross reference is made to the following co-pending patent applications, each being assigned to the same assignee as the present invention and the teachings included herein by reference:

| SERIAL NUMBER | TITLE | FILING DATE |
| --- | --- | --- |
| 08/414,707 | SPATIAL LIGHT IMAGE DISPLAY SYSTEM WITH SYNCHRONIZED AND MODULATED LIGHT SOURCE | 3/31/95 |

FIELD OF THE INVENTION

The present invention generally relates to projection video systems, and more particularity to a display system having a single light valve and multiple lamps achieving improved color balance and brightness.

BACKGROUND OF THE INVENTION

Spatial Light Modulators (SLMs) or light valves are widely used in the industry for video monitors, graphic displays, projectors, and hard copy printers. SLMs and light valves are devices that modulate incident light in a spatial pattern corresponding to an electrical or optical input. The incident light may be modulated in its phase, intensity, polarization, or direction. This light image is directed and focused to a screen in the case of a projector, video monitor or display, or is ultimately focused on a light sensitive material, such as a photoreceptor drum, in the case of a xerographic printer.

The light modulation may be achieved by a variety of materials exhibiting various electro-optic or magneto-optic effects, and by materials that modulate light by surface deformation. Other spatial light modulators may include tiny micro-mechanical devices comprising an array of positionable picture elements (pixels). The light image can be colored if it is to be displayed on a screen of a projector, monitor, or a television and the like. This coloring is typically done in one of two ways, either using non-sequential color systems, or using sequential color systems. A non-sequential color system simultaneously images multiple colors of light, such as red, green and blue light. An example of a non-sequential color system is discussed in commonly assigned U.S. Pat. No. 5,452,024, to Sampsell, entitled "DMD Display System", the teachings included herein by reference. In sequential color systems, color images are generated by sequentially projecting imaged colored light, i.e. red, green and blue light, in a single image frame, which typically lasts $1/60$ of a second. Sequential color systems typically utilize a color wheel that is partitioned into a plurality of color of segments, such as a red, green, and blue segment, or multiples/combinations thereof. An example of a sequential color system is disclosed in commonly assigned U.S. Pat. No. 5,448,314 to Heimbuch, et al entitled "Method and Apparatus for Sequential Color Imaging", the teachings included herein by reference.

A recent innovation of Texas Instruments Inc. of Dallas, Tex. is an SLM imaging system using an array of individual micro-mechanical elements, known as a digital micromirror device (DMD), also referred to as a deformable mirror device. The DMD is a spatial light modulator suitable for use in displays, projectors and hard copy printers. The DMD is a monolithic single-chip integrated circuit, comprised of a high density array of 17 micron square deflectable micromirrors. These mirrors are fabricated over address circuitry including an array of SRAM cells and address electrodes. Each mirror forms one pixel of the DMD array and is bi-stable, that is to say, stable in one of two positions. A source of light directed upon the mirror array will be reflected in one of two directions by each mirror. In one stable "on" mirror position, incident light to that mirror will be reflected to a collector lens and focused on a display screen or a photosensitive element of a printer, and forms an image of the mirror/pixel. In the other "off" mirror position, light directed on the mirror will be deflected to a light absorber. Each mirror of the array is individually controlled to either direct incident light into the collector lens, or to the light absorber. In the case of a display, a projector lens and a light prism ultimately focus and magnify the modulated light image from the pixel mirrors onto a display screen and produce a viewable image. If each pixel mirror of the DMD array is in the "on" position, the displayed image will be an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image can be achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

In non-sequential color systems, three (3) DMD arrays can be used to form an image at an image plane, one DMD for modulating red, green, and blue light, as disclosed in the commonly assigned U.S. Pat. No. 5,452,024, to Sampsell, titled "DMD Display System", the teachings of which are included herein by reference. In contrast, a sequential color system requires only one such DMD device, with the red, green, and blue light being sequentially modulated and reflected by the single DMD array to an image plane . The need for three such DMD arrays in the non-sequential color system triples the requirement for the DMD arrays, and attendant hardware over the sequential color system, but offers increased display brightness. Thus, there is a trade off between the complexity, cost and performance of a non-sequential color system when viewed against a single DMD sequential color system.

In the case of a sequential color system, a single light source is typically used, such as disclosed in U.S. Pat. No. 5,101,236 to Nelson, et al, entitled "Light Energy Control System and Method of Operation", assigned to the same assignee as the present invention and the teachings of which are included herein by reference. The lamp may typically be comprised of a xenon or metal halide arc lamp, or a laser. This arc lamp may be powered by an AC or DC power source.

Multiple light sources can also be implemented in a sequential color system using a single light valve, as disclosed in U.S. Pat. No. 5,428,408. This system includes three projection lamps, one for each of the primary colors, which are sequentially activated. Three occluders are utilized, one blocking or unblocking the light output from the associated lamp. The light output from the associated lamp that ultimately illuminates the light valve is controlled by the pulse driven occluders.

Conventional arc lamps, which may consist of xenon or metal halide arc lamps, are typically deficient in intensity in some portion of the color spectrum. That is, for a given power input, the associated light output levels of red, blue, and green light are unbalanced. A typical lamp is most deficient in red light, and most sufficient in green light. One solution is to address color balance disclosed in the commonly assigned U.S. patent application Ser. No. 08/414,707 entitled "Spatial Light Image Display System with Synchronized and Modulated Light Source", where each of three lights can be individually driven and amplitude modulated to achieve color balance. The teachings of this patent application are included herein by reference.

It is desired to provide a sequential color imaging system utilizing a single light valve or spatial light modulator, and only two lamps to provide a cost efficient color balanced and bright system. It is further desired to implement conventional arc lamps that require operation at a rated power level in order to provide optimal power dissipation.

SUMMARY OF THE INVENTION

The present invention achieves technical advantages as a two lamp single light valve imaging system. One lamp is utilized for generating red light, and a second lamp is utilized for generating both blue and green light. The first lamp is driven at 3× it rated power rating for ⅓ of a video frame, thus being driven at its average power rating over 1 video frame. The second lamp is pulse driven at 150% of its rated power rating for ⅔ of a video frame, thus also being driven at its average power rating over 1 video frame.

The illumination system of the present invention comprises a light valve modulating a light beam impinging thereon as a function of an incoming video signal representing a series of video frames. A first and second lamp generates a first light source and a second light source, respectfully. Optics direct the first light source and the second light source to the light valve to form the light beam. A light coloring device colors the first light source a first color, and also alternately colors the second light source a second color and third color. A lamp driver circuit pulse drives the first lamp when the color device colors the first light source the first color, the lamp driver circuit also pulse driving the second lamp when the color device alternately colors the second light source both the second color and the third color. The first and second lamps are pulse driven at a peak power level being higher than average power rating of the respective lamp, but wherein the lamps operate at a rated power level over each video frame to last an acceptable life span. In addition, pulse driving these lamps above their power ratings achieves greater light output for the respective color, thereby achieving a brighter image as formed by the light valve. The first color is preferably red which is the most deficient color, and the second and third colors being blue and green, respectively.

BRIEF DESCRIPTION OF THE DRAWINGS

FIG. 2 is a waveform diagram illustrating the synchronization of the lamp driving waveforms, and also the peak amplitude of the driving waveforms which drive the associated lamps at a peak power being substantially greater than the average power rating of the lamps;

FIG. 3 is a graph of a spectrum for a red-deficient lamp;

DESCRIPTION OF THE PREFERRED EMBODIMENT

While an imaging system according to the present invention is described in considerable detail with regards to a DMD-type spatial light modulator for purposes of illustration and clarity, limitation to using this specific type of light valve is not to be inferred as the present invention is applicable to other light valve imaging systems including, but not limited to, LCD imaging systems.

Figure 1:
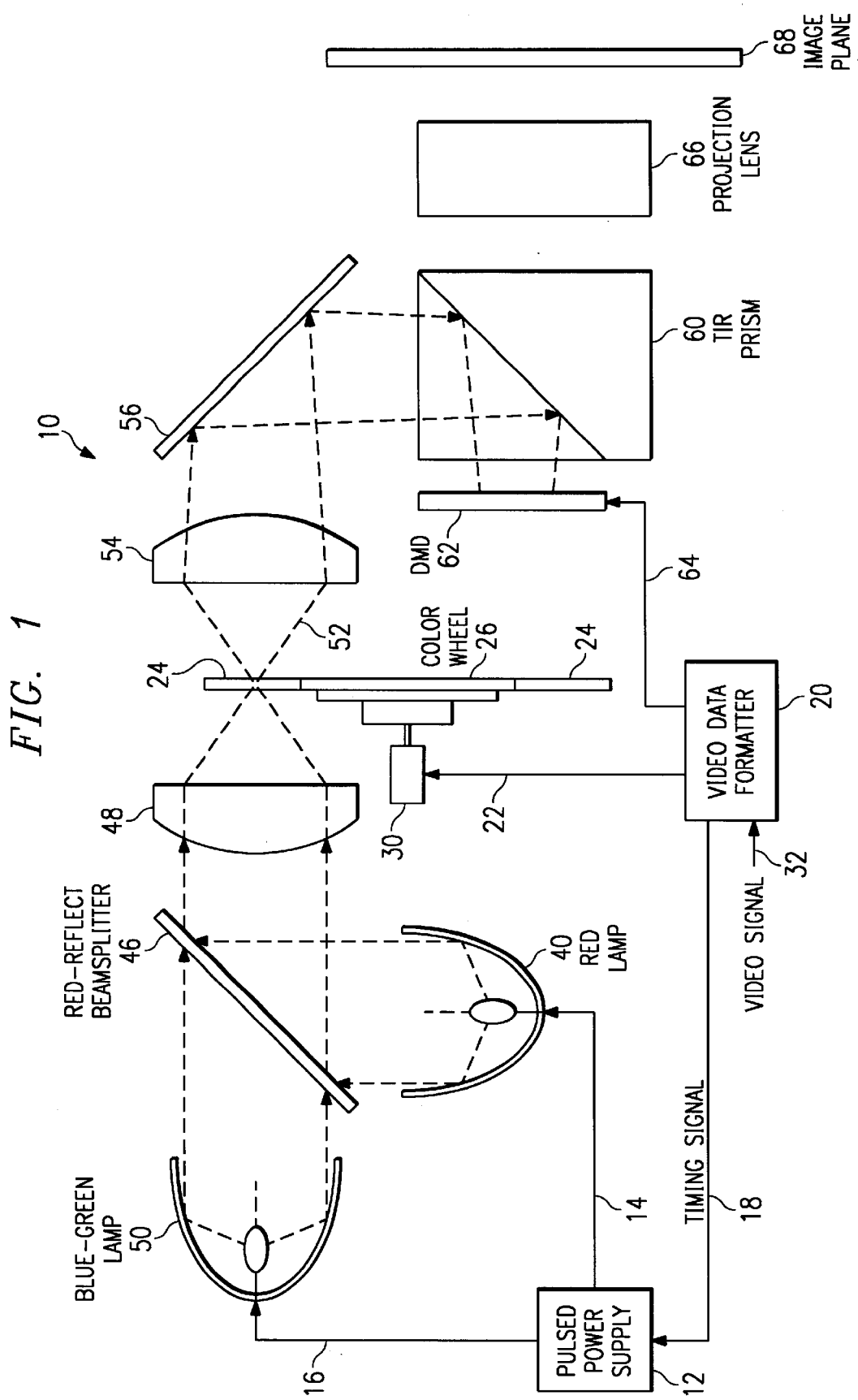
FIG. 1 is a block diagram of a sequential color imaging system including control circuitry pulse driving two light sources, one source used for providing red light and the other source for providing blue and green light.
Figure 4:
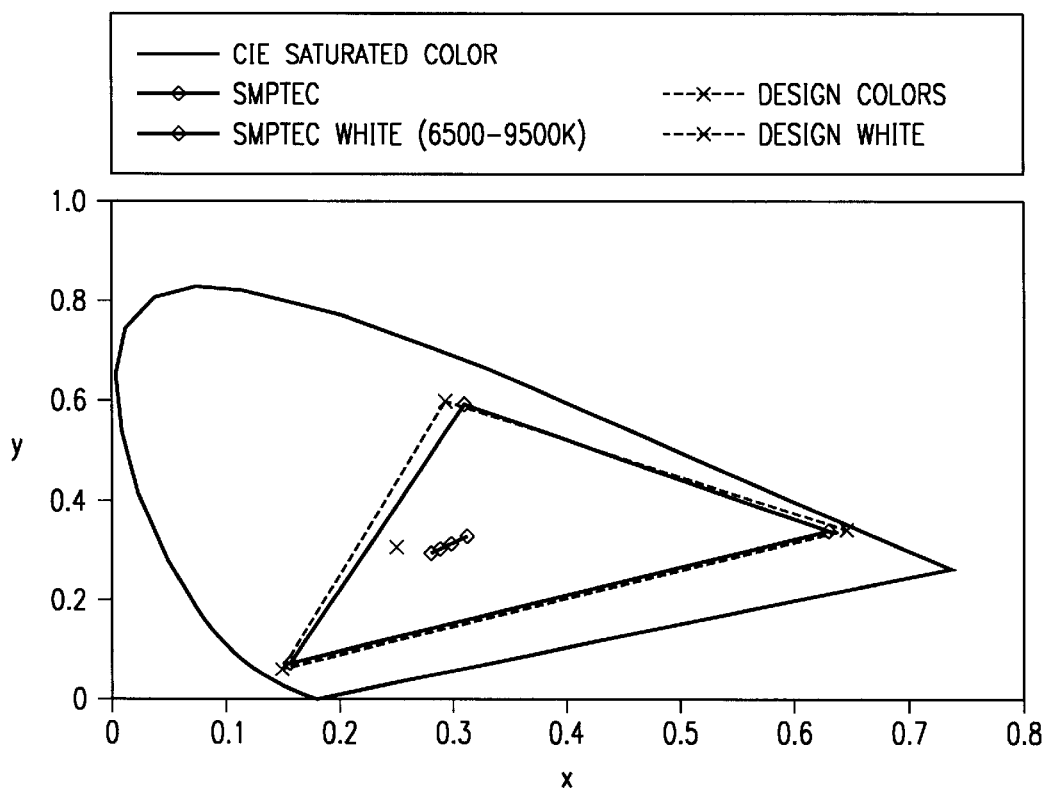
FIG. 4 is a graph of a red, green and blue color gamut produced by conventional DC driven lamps.

Referring now to FIG. 1, a block diagram of a sequential color imaging system according to the preferred embodiment of the present invention is generally shown at 10. Imaging system 10 is seen to include a pulse driven lamp controller and power supply 12 having two pulsed drive outputs 14 and 16. The lamp controller and power supply 12 provides lamp drive signals on outputs 14 and 16 as a function of a timing signal provided on input line 18. A video data formatter 20 provides the timing signal on line 18, which timing signal is synchronized to a wheel position signal provided, or received in the alternative, by video data formatter 20 on outline 22. The timing signal provided on line 18 is synchronized with the position of the colored segments 24 of a color wheel 26, such as red, green and blue color segments. More particularly, a signal, such as the leading edge of a pulse or other equivalent signal, is generated by video data formatter as the red color segment 24 is positioned to color the incident generated light. Video data formatter 20 controls a DC stepper motor 30 to precisely rotate color wheel 26 at 60 rotations per second, which corresponds to the 60 frames per second of video data provided on input line 32. In the alternative, an optical sensor can be provided if desired to sense a marker on the wheel 26 proximate the red segment to further ascertain when the red segment 24 is being illuminated.

A first projection arc lamp 40 is seen to be pulse driven by the pulsed drive output 14 provided by the pulsed power supply 12. This first lamp 40 is used to ultimately generate red light. More specifically, lamp 40 generates white light towards a dichroic filter or beam splitter 46. This beam splitter reflects the red component of the incident light towards a first condenser lens 48, and passes the blue and green components of the white light. Lamp 40 is pulse driven only when the red segment 24 of color wheel 26 is being illuminated.

Still referring to FIG. 1, a second projection arc lamp 50 is provided for ultimately generating blue and green light. Lamp 50 is pulse driven by the pulsed drive output 16. Lamp 50 generates and directs white light to beam splitter 46, whereby the green and blue components of the incident light is transmitted therethrough, with the red component of the light being reflected away from lens 48. Lamp 50 is driven by pulsed power supply 12 and generates light only when the blue and green segments 24 of color wheel 26 are advanced to color the incident light focused thereon by optics lens 48.

The multiple color segments 24 provided on wheel 26 are typically red, blue and green. In some applications, two color segments of each color are provided, for a total of six color segments. In yet another alternative application, color segments of different colors can be utilized, such as clear, yellow and blue or yellow, yellow and blue if desired. The advantage of using these colored segments for a color wheel is that the coatings are easier to manufacture and therefore are cheaper. When the red lamp 40 is pulsed on by power supply 12, either a clear segment or a yellow segment of the color wheel 26 is used to transmit red light. When the blue-green lamp 50 is pulsed on by power supply 12, the blue segment of the color wheel 26 is used to transmit blue light and the yellow segment to transmit green light. Thus, the red-green-blue color wheel can be replaced by a clear-yellow-blue, or a yellow-yellow-blue color wheel. If three color segments are provided, each segment is illuminated $\frac{1}{180}$th of a second, or once each video frame. If six colored segments are utilized, each segment is illuminated $\frac{1}{360}$th of a second, again, each color segment being illuminated one time each video frame.

The colored light 52 generated by color wheel 26 is seen to be transmitted to a second condenser lens 54 and focused upon a light reflector 56. The colored light 52 is preferably directed by reflector 56 to a total internal reflection (TIR) prism 60. Prism 60 reflects the colored light to a light valve 62, such as a DMD, a LCD or other suitable light valve, for imaging. It is noted that use of reflector 56 and prism 60 is not necessary, but is desired to achieve compactness of the system. The light valve 62 separately images the sequence of colored light according to a video data signal provided on line 64 by the video data formatter 14. The video data signal on line 64 is color frame data coordinated with the position of the color wheel 26. When light valve 62 is illuminated with a given color, to produce a color subfield, the video data signal on line 64 corresponds to the color of light being modulated by valve 62. This imaged light is reflected back to the TIR prism 60, prism 60 directing the imaged light to a projection lens 66 and ultimately focused at an image plane, such as a display screen 68. The eye fuses the three sequential color subfields generated by valve 62 into full motion, full color video.

Referring to FIG. 2 in view of FIG. 1, the first or red lamp 40 is driven by a pulsed drive signal seen as waveform 80. The second lamp 50, or blue-green lamp, is driven by a pulsed signal seen as waveform 82. Waveform 80 and 82 are each timed off the timing signal 86 generated on line 18. The red lamp is driven such that the peak power level of waveform 80 is 3X the average peak power rating of the associated lamp 40 for $\frac{1}{3}$ of a video frame, i.e. $\frac{1}{180}$th of a second. Thus, for one video frame the lamp 40 is driven at its average power rating. Similarly, the blue-green lamp 50 is pulse driven by waveform 82 at a peak power level being 150% of the average power rating of the associated arc lamp, 50 for $\frac{2}{3}$ of a video frame, i.e $\frac{1}{90}$th of a second. Thus, the second lamp 50 is also driven at its average power rating for one video frame.

By driving both lamps in this manner, several significant advantages are achieved. First, the associated lamps provide a significantly increased lamp output being higher than the average power rating of the lamp, providing increased brightness of light ultimately imaged by the light valve 62 and visually observed at image plane 68. That is, imaged red light is generated to be 3X the brightness of that obtainable if only a single lamp was utilized and driven 100% of the time at its average power rating. A 150% increase of the imaged blue light and green light is achieved by driving the second lamp at a peak power being 50% higher than its average rating for $\frac{2}{3}$ of a video frame. Since the two lamps, which are preferably identical, are typically deficient in the red spectrum, the brightness of the red light now available for imaging is 3X brighter while only using two lamps.

The improvements in color produced by enhancing the red portion of the spectrum according to the present invention can be seen from FIG. 3, FIG. 4, FIG. 5 and FIG. 6. The spectrum for a red-deficient lamp is shown in FIG. 3. By passing the lamp spectrum of a DC driven lamp through the color filters shown the produced red, green and blue color gamut is shown by the design colors in FIG. 4. The resulting projected colors are reasonably well saturated, but the design white point has a very high color temperature of 12,429 K.

Figure 5:
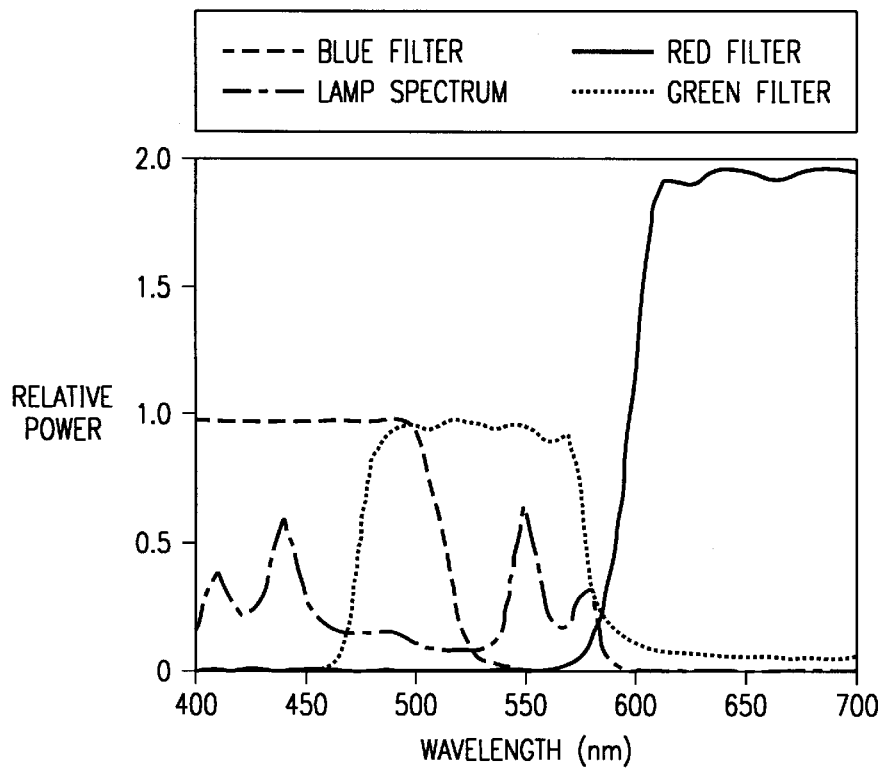
FIG. 5 is a graph of the produced color filters produced by a pulsed red lamp according to the present invention.
Figure 6:
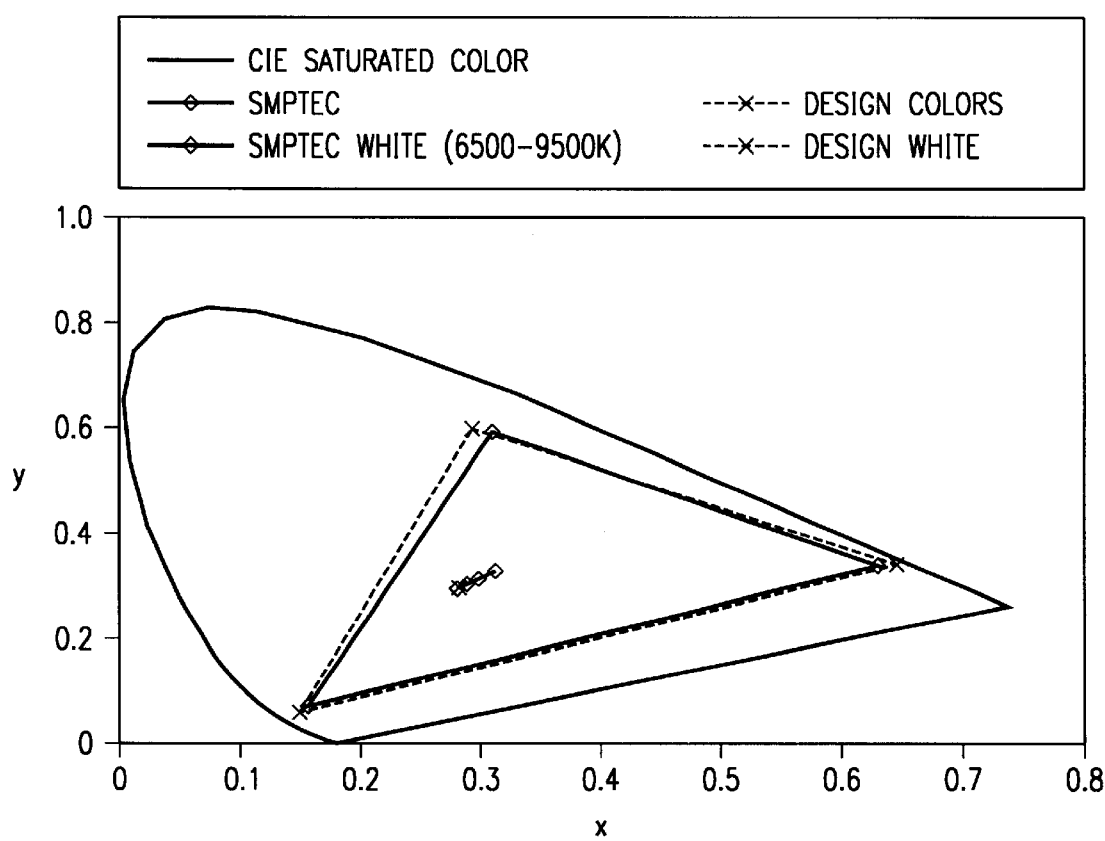
FIG. 6 is a graph of the color gamut produced by the present invention using a pulsed red lamp.

In contrast, according to the present invention, by increasing the intensity of red light by pulsing the lamp 40, the amplitude of the light passing through the red segment is doubled with respect to the amplitude of the light passing through each of the green and blue segments as shown in FIG. 5. This effect is represented in FIG. 5 as a red filter with increased transmission with respect to green and blue. The result is that the color gamut is the same as shown by the design colors in FIG. 6. However, the color temperature drops to a more reasonable 9,182 K.

According to the present invention, each of the projection lamps 40 and 50 are driven at a consistent power level being their rated power level and will thus have a sufficient life span. The present invention provides improved image brightness and color balance as compared to a single light source system, and utilizes a single light valve. The architecture is simple and less costly than a system utilizing three light sources.

While the present invention has been detailed utilizing a color wheel, other color filtering systems could be utilized as well to color the light, such as liquid crystal devices (LCD) or even DMDs, and thus limitation to using a color wheel is not to be inferred as other coloring systems are suitable. Broadly, the present invention is intended to include a two lamp illumination system synchronized with a color filter and single light valve for improved color balance and brightness.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An illumination system, comprising:
    a light valve modulating a light beam impinging thereon as a function of a video signal representing a series of video frames;
    a first lamp and a second lamp generating a first light source and a second light source, respectively;
    optics directing said first light source and said second light source to said light valve to form said light beam;
    color means for coloring said first light source a first color and for alternately coloring said second light source a second color and a third color; and
    a lamp driver circuit driving said first lamp when said color means colors said first light source said first color, said lamp driver circuit driving said second lamp when said color means alternately colors said second light source both said second color and said third color.

2. The illumination system as specified in claim 1 wherein both said first lamp and said second lamp are pulse driven by said lamp driver circuit at a peak power level being higher than an average power rating of the respective lamp.

3. The illumination system as specified in claim 1 wherein said first color is red, and said second color and said third color is blue and green, respectively.

4. The illumination system as specified in claim 1 wherein said first lamp is driven on for approximately one-third the time for each said video frame, and said second lamp is driven on for approximately two-thirds the time for each said video frame.

5. The illumination system as specified in claim 4 wherein said first lamp is driven on at a peak power level being approximately three times the average power rating of said first lamp.

6. The illumination system as specified in claim 5 wherein said second lamp is driven on at a peak power level being approximately one and one-half the average power rating of said second lamp.

7. The illumination system as specified in claim 1 wherein said first lamp and said second lamp consist of an arc lamp.

8. A method of operating an illumination system as a function of a video signal representing a series of video frames, comprising the steps of:

a) driving a first lamp a first fraction of each said video frame to generate a first light source, and driving a second lamp a second fraction of each said video frame to generate a second light source;

b) coloring said first light source a first color, and alternately coloring said second light source both a second color and a third color;

c) directing said colored first light source and said colored second light source to a light valve; and d) modulating said colored first light source and said second light source with said light valve to form an image.

9. The method as specified in claim 8 comprising the step of pulse driving both said first light source and said second light source at a peak power being higher than an average power rating of the respective lamp.

10. The method as specified in claim 9 wherein said first lamp is pulse driven for approximately one-third the time of each said video frame, and said second lamp is pulse driven for approximately two-thirds the time for each said video frame.

11. The method as specified in claim 10 wherein said first lamp is pulse driven at a peak power level being approximately three times the average power rating of said first lamp.

12. The method as specified in claim 11 wherein said second lamp is pulse driven at a peak power level being approximately one and one-half times the average power rating of said second lamp.

13. The method as specified in claim 8 wherein said first color, said second color and said third color consist of red, blue and green, respectively.

\* \* \* \* \*